Aug. 24, 1965  R. D. SMITH  3,201,805
COMBINED SEAT, HASSOCK AND CONVERTIBLE BED
Filed Oct. 8, 1963  2 Sheets-Sheet 1
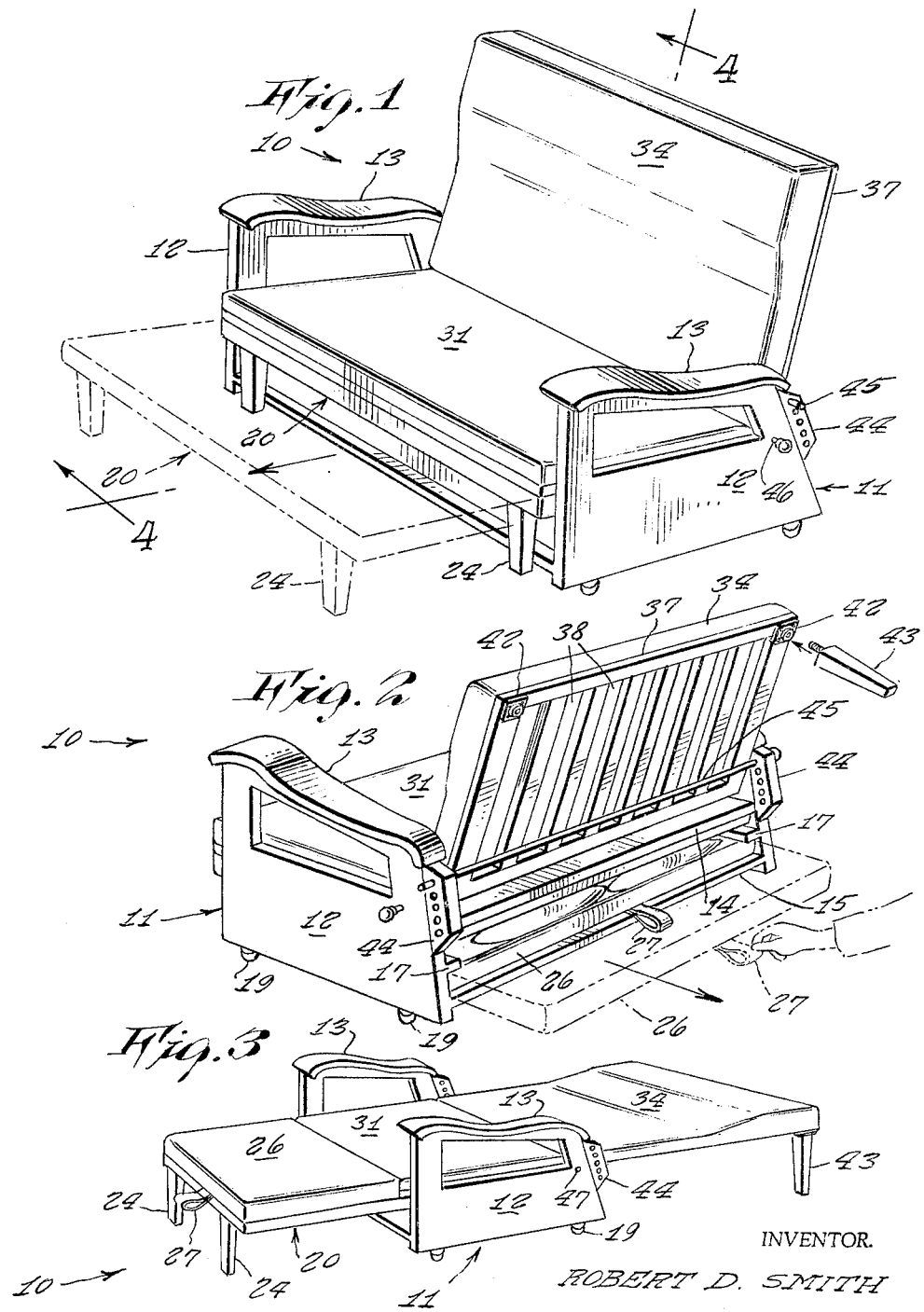
INVENTOR.
ROBERT D. SMITH

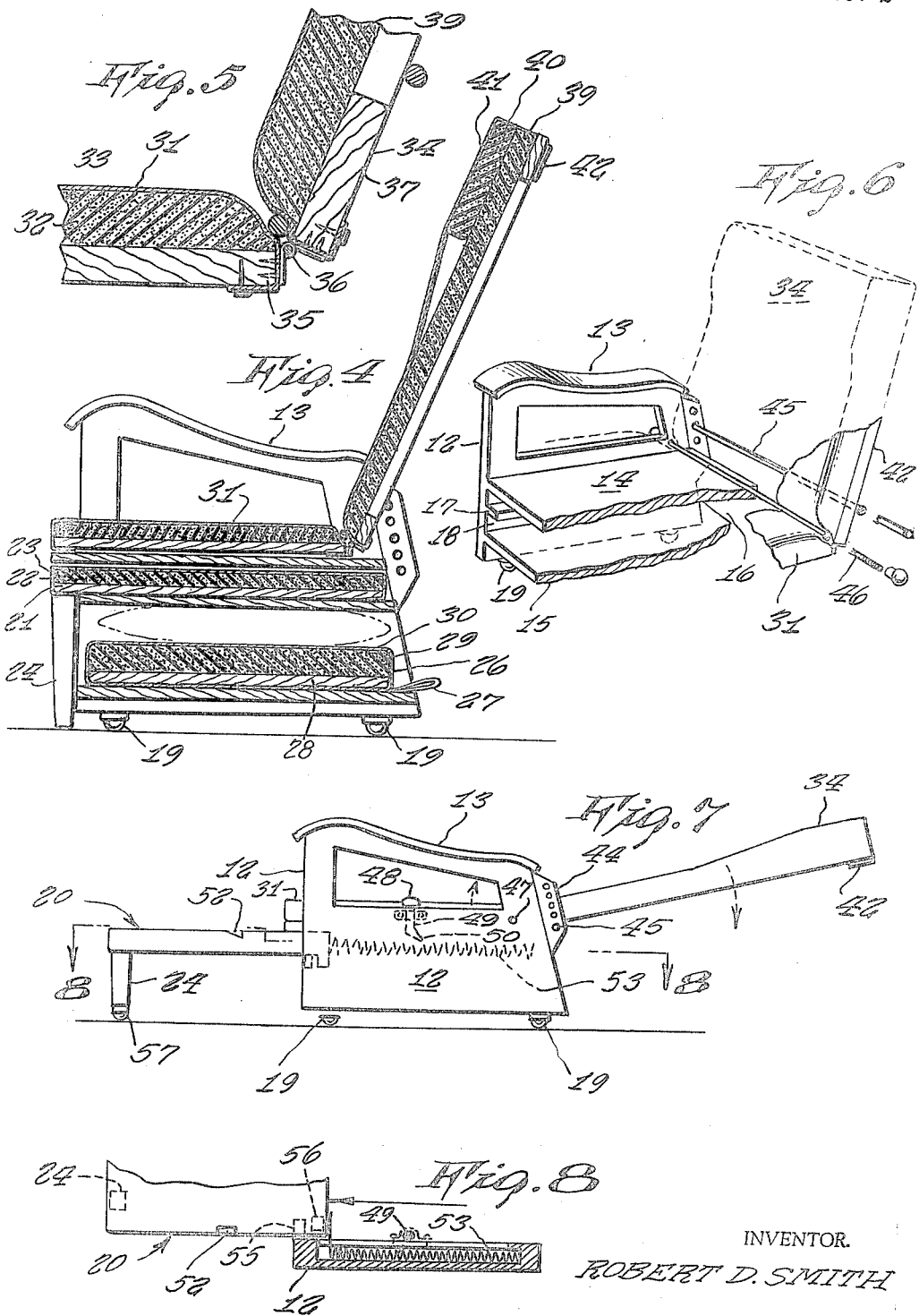

United States Patent Office 3,201,805
Patented Aug. 24, 1965

3,201,805
COMBINED SEAT, HASSOCK AND
CONVERTIBLE BED
Robert D. Smith, 2742 E. Tremont Ave., Bronx 61, N.Y.
Filed Oct. 8, 1963, Ser. No. 314,671
1 Claim. (Cl. 5—18)

This invention relates generally to furniture; more specifically it relates to couch type seats.

The principal object of the present invention is to provide an item of furniture which is adaptable for use as a seat alone, or selectively as a seat with hassock attached, and convertible into a bed.

Another object of the present invention is to provide a seat having a back rest which may be selectively inclined to any desired angle for maximum comfort.

Still another object is to provide a seat having a self contained retractible hassock; the seat having a mechanism for impelling the hassock forwardly into extended operative position.

Other objects are to provide a combination seat, hassock and convertible bed which requires a minimum effort to convert from one use to another, which is relatively simple in design, light in weight and inexpensive to produce.

Other objects of the invention will become readily apparent upon a study of the following specification and the accompanying drawings wherein:

FIGURE 1 is a front perspective view of the device in operative use as a seat and showing in phantom lines the hassock in an extended position.

FIGURE 2 is a rear perspective view thereof showing in exploded position a supporting leg and illustrating in phantom lines a cushion being removed.

FIGURE 3 is a perspective view showing the device converted into a bed.

FIGURE 4 is a cross sectional view through 4—4 of FIGURE 1.

FIGURE 5 is an enlarged view of a portion of the structure shown in FIGURE 4.

FIGURE 6 is a fragmentary front perspective view of the main body and associate cross rods.

FIGURE 7 is a side elevation showing the device as a reclining couch.

FIGURE 8 is a fragmentary cross sectional view taken on line 8—8 of FIGURE 7.

Referring now to the drawing in detail, the numeral 10 represents a combination seat, hassock and convertible bed according to the present invention wherein there is a main body member 11 comprised of a pair of upstanding end walls 12 having arm rests 13. A horizontal upper panel 14 and lower panel 15 are rigidly affixed to and between the end walls providing a space 16 therebetween. A runner 17 is affixed to each inner side 18 of the end walls, within the space 16. Casters 19 are placed under each end wall for easily moving the device about a room.

A hassock element 20 comprised of a wooden panel 21 having a cushion 22 of foam plastic, or the like and covered by a decorative fabric 23 or the like is provided with a pair of upstanding legs 24 along the front edge 25. The hassock is supported on the runners and is slidable forwardly thereupon.

A cushion 26 comprised of a panel 28, foam plastic stuffing 29 and a covering 30 is fitted into the space 16 when not in use. A pull strap 27 permits easy withdrawal of the cushion out of the rear side of the main body as shown in FIGURE 2. The cushion is of a thickness whereby placement thereof upon the extended hassock will align the upper surface of the cushion 26 with the upper surface of a cushion 31 placed upon panel 14.

The cushion 31 is comprised of a panel having a foam plastic stuffing 32 covered by a fabric 33. A back rest 34 is attached pivotally free to the rear edge 35 of cushion 31 by means of a piano hinge 36. The back rest is comprised of a frame 37 having a plurality of crosspieces 38, a foam plastic stuffing 39, a secondary foam plastic stuffing 40 providing a deeper cushion area at the head rest portion 41 of the back rest, and a fabric cover enclosing the foam plastic parts. At the rear side of the head rest a pair of adaptors 42 are attached for selectively receiving threaded ends of detachable legs 43.

A block 44 is affixed to the rear of each end wall, the block having a plurality of openings for selectively receiving a rod 45 which extends across the area of the back rest thereby supporting the back rest at various angles. A secondary cross rod 46 is receivable within an opening 47 in each end wall and is for the purpose of holding down the hinged cushion-back rest element preventing it from sliding forwardly as shown in FIGURE 6. In operative use it rests over the hinge. It is to be understood that the rod 46 may be selectively used when it is detached from the device, the back rest may be pivoted over the fulcrum formed by rod 45 thereby giving the seat occupant a pleasurable reciprocating motion by the rise and fall of the cushion and back rest in the area immediately adjacent the hinge when body force is applied to the head rest end of the back rest.

In a modified construction shown in FIGURE 7, the hassock can be conveniently discharged forwardly from within the main body while a person is seated on the seat cushion 31 by simply lifting buttons 48 on each end wall. This causes pull rod 49 to lift pawl 50 thereby disengaging the pawl from notch 52 thus allowing compression coil spring 53 to push the hassock forwardly. The hassock is manually pushed into the main body when no longer needed in out position. A stop 55 limits the forward travel of the hassock by abutting bumper 56. Casters 57 can be added to the hassock legs for easier travel.

In operative use cushion 26 can be placed on the hassock if preferred to bring it to equal level with cushion 31. The back rest can be inclined to any angle by relocating rod 45, or removing it entirely when the device is used as a bed.

Rod 46 can be selectively used or removed as preferred. Legs 43 are attached to adapters 42 when the device is to be used as a bed.

While various changes may be made in the detail construction, it shall be understood that such changes will be within the spirit and scope of the present invention as defined in the appended claim.

What I claim as new and desire to secure by Letters Patent is:

In an item of furniture the combination of a main body member forming a seat element, a hassock slidably receivable within said main body member, and a cushion and back rest unit having a pivotable back rest for selective adjustment between a relatively vertical position and a horizontal position to form a bed, said main body comprising a pair of spaced apart end walls, an upper and a lower panel between said end walls and rigidly affixed thereto, a space between said panels, a runner between said panels affixed to the inner side of each of said end walls, said hassock comprising a cushioned panel having a pair of legs at its front edge, the rear edge of said cushioned panel being supported upon said runners, said hassock being slidable forwardly outward from said main body, said cushion and back rest unit comprising a pair of cushioned panels connected pivotally together by a hinge mounted on said panels forming said cushion and back rest unit, a first cross rod, a plurality of spaced apart openings in each of said end walls to selectively receive said first cross rod for supporting the rear side of said back rest, a second cross rod, an opening in each of said end walls to receive said second cross rod, said second rod selectively retaining said cushion and back rest unit by bearing against the upper side of said hinge, said back rest unit having a head rest portion at the end opposite the end adjacent said hinge, a pair of adaptors on the rear side of said head rest portion, a pair of detachable legs attachable to said adaptors to form said bed, a pair of compression coil springs supported within said main body end walls normally urging said hassock forwardly, a pull button upon each end wall, and a pull rod under each pull button connected to a pawl receivable within a notch at each end of said hassock, said pawl in engaged position with said notch retaining said coil spring in compressed position.

References Cited by the Examiner

UNITED STATES PATENTS

| 479,071 | 7/92 | Holstein | 5—58 |
| 990,401 | 4/11 | Stanyon | 5—18 X |
| 1,343,044 | 6/20 | Eschenbrenner | 5—41 |
| 1,359,027 | 11/20 | Bryld | 5—41 X |
| 2,240,204 | 4/41 | Bell | 5—38 X |
| 2,392,688 | 1/46 | Nagele | 5—18 X |
| 3,082,435 | 3/63 | Philips et al. | 5—3 X |
| 3,123,836 | 3/64 | Bendell | 5—56 X |

FOREIGN PATENTS

| 331,496 | 7/30 | Great Britain. |

FRANK B. SHERRY, *Primary Examiner.*